April 30, 1957 E. F. KOHL ET AL 2,790,219
SHELL MOLD STRUCTURES AND PROCESSES AND COMPOSITIONS
FOR FORMING THE SAME
Filed Nov. 24, 1954 2 Sheets-Sheet 1
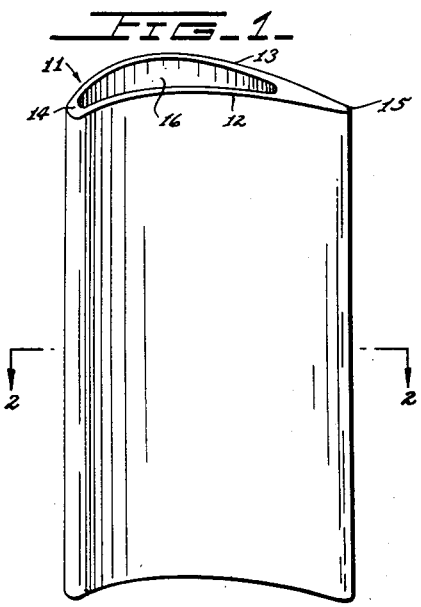
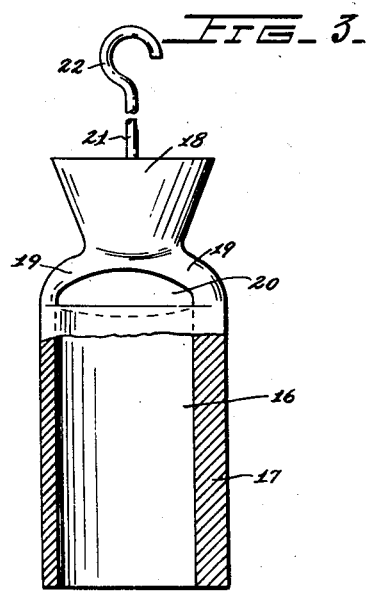
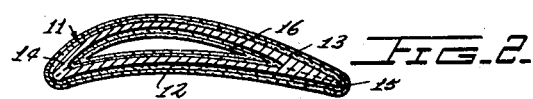
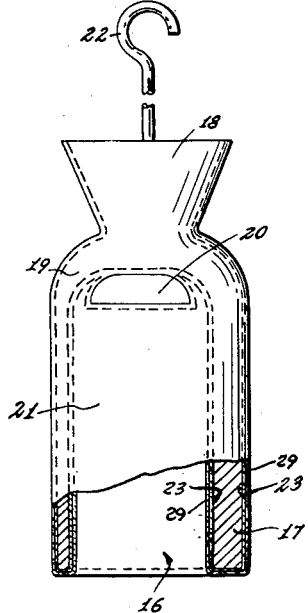
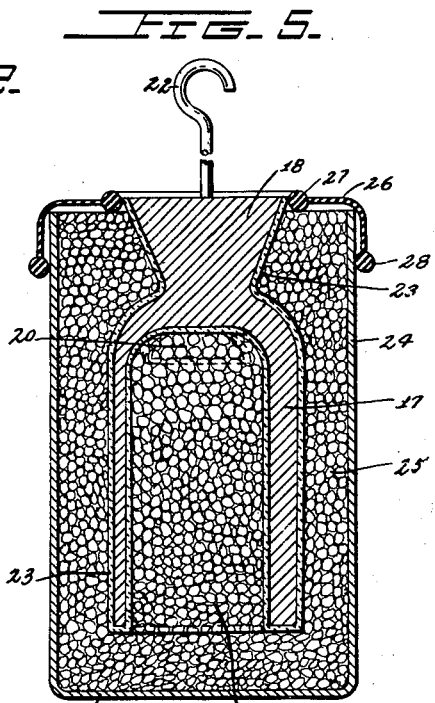
INVENTORS
E. F. KOHL
H. LIPSEY
BY
Greene, Pineles & Durr
ATTORNEYS

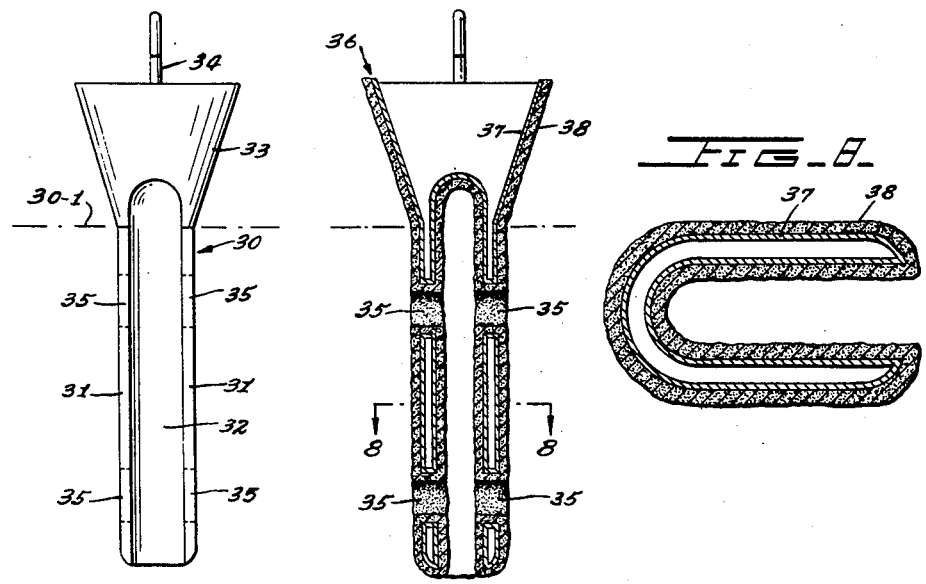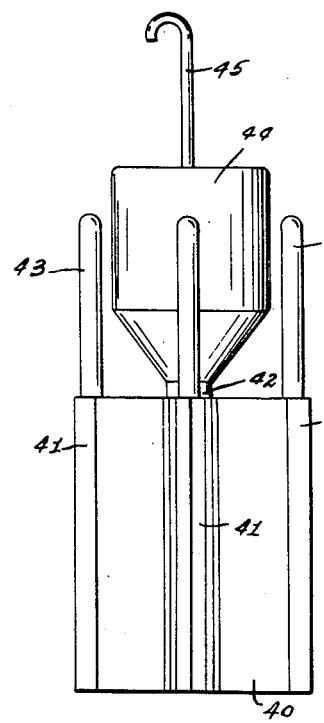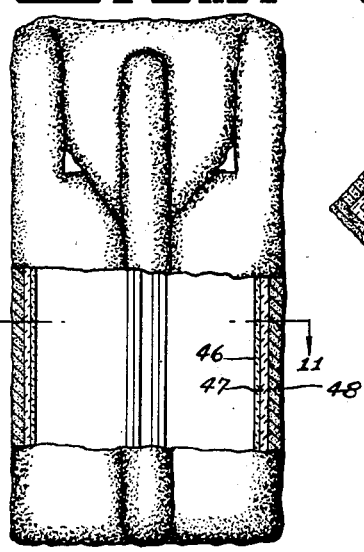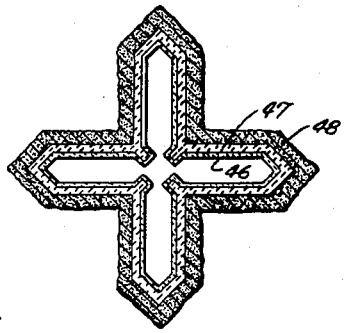
INVENTORS
E. F. KOHL
H. LIPSEY
ATTORNEYS

United States Patent Office 2,790,219
Patented Apr. 30, 1957

2,790,219

SHELL MOLD STRUCTURES AND PROCESSES AND COMPOSITIONS FOR FORMING THE SAME

Everard F. Kohl, Lakewood, Ohio, and Henry Lipsey, New Castle, Pa.; said Lipsey assignor to Mercast Corporation, a corporation of Delaware Application November 24, 1954, Serial No. 474,000

29 Claims. (Cl. 22—196)

This application is a continuation-in-part of our application Serial No. 7,954, filed February 12, 1948, now abandoned.

This invention relates to processes of preparing shell mold structures by means of frozen mercury patterns defining the cavity into which objects are to be cast, to mold structures produced by such processes, and to compositions utilized in preparing such mold structures.

As a result of past efforts, there has been developed a commercial method of preparing precision castings by molds made with what is known as the "lost-wax" method. However, the "lost-wax" method of precision casting has many serious limitations. With the "lost-wax" method it is impossible to produce thin-walled porous shell molds with mold cavities of fine surface finish for use in casting metal parts having intricate shape. Because of the relatively great expansion coefficient of wax-like or plastic patterns, molds formed over such patterns must be of relatively great thickness to resist the large expansion forces of such pattern when the mold and pattern are heated to melting or burning-out temperature of the pattern for removing the pattern from the mold cavity. In addition it is impossible to produce with patterns of wax-like or plastic materials molds for use in casting large-size parts, because the large wax patterns tend to sag. Furthermore, if a pattern of wax-like or plastic material is used for preparing a mold for a large-size casting, the volumetric change caused by the expansion of the wax or plastic pattern material is so great that large stresses are imparted the thick-walled mold, causing the mold to crack.

Among the objects of the invention are porous molds wherein the refractory particles of at least the inner shell layer are bound by an inorganic binder which is free from phosphorus and like compounds that have a tendency to contaminate the high-temperature alloy metals cast into the mold cavity. In accordance with the invention, at least the inner shell layer of a mold is formed of refractory particles which have been bound into a firm structure by heating the refractory particles together with an admixture of an inorganic binder comprising a metal fluoride together with a boron compound selected from boric acid, boric oxide and metal borates to a temperature at which such inorganic binder combines with the refractory particles into a firm mold structure.

The various phases of the invention will be better understood from the following description and exemplifications thereof with particular reference to the drawings, in which Fig. 1 is an isometric view of a vane of gas turbine to be cast in accordance with the invention;

Fig. 2 is a cross-sectional view of frozen mercury pattern of the vane;

Fig. 3 is a partial sectional view of a frozen mercury pattern used in making a shell mold of Fig. 2;

Fig. 4 is an elevational view, partly in cross-section of the frozen mercury pattern of Fig. 3, with one type of a shell mold of the invention formed thereon;

Fig. 5 is a vertical cross-section of the frozen mercury pattern of Fig. 3 with another type of shell mold formed thereon, as supported in a flask by a mass of loose refractory particles;

Fig. 6 is a front view of another frozen mercury pattern;

Fig. 7 is a central sectional view of a shell mold formed on the frozen mercury pattern of Fig. 6 in accordance with the invention;

Fig. 8 is an enlarged cross-sectional view on the line 8—8 of Fig. 7;

Fig. 9 is an elevational view of another frozen mercury pattern;

Fig. 10 is a similar view of a shell mold formed in accordance with the invention on the frozen mercury pattern of Fig. 9;

Fig. 11 is a cross-sectional view along line 11—11 of Fig. 10.

Referring to Figs. 1 through 4, there will now be described the phase of the invention wherein one form of a thin-walled shell mold is formed on a complex frozen mercury pattern. Figs. 1 and 2 indicate, by way of example, a gas turbine vane 11 having a hollow interior 16 and which is to be cast in accordance with the invention. The vane 11 has an air-foil contour with a generally concave thin blade section 12 and a generally convex thin blade section 13 joined along the front edge region 14 and rear edge region 15. The vane 11 may also have an axial twist along its length.

If a frozen mercury pattern of such a turbine vane is difficult to produce from a single permanent master mold, it may be produced by making separate frozen mercury patterns of sections 12 and 13 in separate partible permanent molds. The separate sectional mercury patterns 12 and 13 may then be joined or welded at mating surfaces indicated by dashed lines in Fig. 2 to form a single, continuous integral frozen mercury pattern. The several pattern sections may be provided along their mating surfaces with suitable interfitting male and female aligning elements to facilitate ready alignment of the several pattern sections into the desired complex pattern. Such individual frozen mercury pattern sections, when brought into abutment along their mating surfaces, will become united and welded into the self-supporting complex frozen mercury pattern of the desired object which would be difficult to produce with a single permanent master mold.

Such gas turbine vanes are made of alloy metal having high hot strength and a corresponding high melting temperature. When such alloy metal is cast into the mold cavity, it will, upon solidifying, contract about the core portion of the mold which gives shape to the hollow interior of the vane. The molds for casting such parts must have mold walls which are thin enough to yield, as otherwise the thin walls of the casting may be subjected to cracks as the molten metal cools and tends to contract about the unyielding core portions of the mold structure. By making the mold structure with thin shell walls which yield when subjected to the contracting forces of the solidifying molten metal, these difficulties are avoided.

Fig. 3 shows a cross section of the frozen mercury pattern 17 of vane 11 with a sprue 18 of frozen mercury attached thereto by means of frozen mercury arms 19 which bridge the narrow border regions of the vane-shaped frozen mercury pattern. This bridge arrangement provides passages to the inner surfaces of the hollow frozen mercury pattern 17 facing the hollow interior 16, which inner pattern surfaces are to be coated with the shell-forming coating compositions. A strong rigid metal hook 22 having a shank which is frozen in the sprue gate portion 18 of the frozen mercury pattern, is utilized in manipulating the frozen mercury pattern while coating it with the shell mold forming compositions. Frozen mercury in the pure state is especially suitable for practicing the invention, although it is not limited thereto as long as the impurities do not affect the physical properties of mercury which render it suitable for practicing the invention.

The frozen mercury pattern 17 is now ready for coating with the mold forming composition. This is accomplished by repeatedly immersing the frozen mercury pattern in, or pouring over its surface a slurry of the coating composition while the pattern and the slurry are maintained at a temperature below the freezing point of mercury. The coating slurry comprises a liquid carrier, fine particles of refractory material, a raised temperature binder for the refractory particles which is ineffective at the freezing temperature of mercury but which becomes effective as a binder for the refractory particles at raised temperatures and an organic resinous binder that has the physical property of being adherent to the frozen mercury pattern at temperatures below the freezing point of the pattern and which is effective as a binder for the refractory particles and the raised temperature binder at temperatures from below the freezing point of mercury up to the raised temperature at which the raised temperature binder becomes effective as binder for the refractory particles and of causing the bound particles to adhere to the frozen mercury pattern at such very low temperatures. The raised temperature binder is so chosen that it becomes effective as a binder for the refractory particles at raised temperatures below that at which the resinous binder ceases to have the required properties of holding the refractory particles bound in the desired shell mold. The liquid carrier is chosen to have a low boiling point and to volatilize in a short period of time at temperatures from below the freezing temperature of mercury, i. e. below —40° C. up to about normal temperatures, such as up to 0° C.

The viscosity of the refractory slurry depends upon the size and complexity of the frozen mercury pattern to be coated. For example, the slurry must be thin enough to readily penetrate all narrow openings or slits and all narrow corners. Between each successive coating, by immersion or dipping of the pattern in the slurry, or by spraying the slurry on the pattern, a period of time is allowed to at least partially dry the applied coating stratum or film. The successive coating and drying operations are carried on until a shell layer of the desired thickness has been formed around the surfaces of the frozen mercury pattern. After applying the last coating stratum, the shell layer or mold is dried.

Both the coating and drying of each shell layer stratum should be carried on in an atmosphere refrigerated to well below the freezing point of the mercury pattern material. In particular, the drying of the shell mold layer should be effected at temperatures below the boiling point of the carrier so as to provide a smooth film or shell layer. The drying may be expedited by circulating through the drying space where intermittent drying takes place an atmosphere of air refrigerated to below the freezing temperature of the mercury pattern material and below the boiling point of the carrier. The vapor of the liquid carrier absorbed into the refrigerated atmosphere may be recovered by conventional compression techniques or the like, whereby the liquid carrier may be used again to form the coating composition. The continuous circulation of the refrigerated atmosphere from which the carrier vapors have been removed, also reduces the vapor pressure of the liquid carrier, thereby expediting the volatilization of the liquid carrier from the coating layers. A suitable degree of vacuum may be applied to the drying space for expediting the volatilization of the carrier.

Fig. 4 shows a substantially self-supporting mold structure with thin shell walls consisting of the shell layers formed in accordance with the invention over the frozen mercury pattern of the vane of Fig. 3. The thin shell mold generally designated 21 (Fig. 4) has an inner thin shell layer 23 and an overlaying supporting or backing shell layer 29 forming with the inner shell layer 23 a self-supporting shell mold structure from which the frozen mercury pattern 17 may be readily removed, as by heating to above its melting point of mercury and pouring it out of the mold cavity. The two layer shell mold 21 so formed is sufficiently thin to yield when molten metal cast into the mold cavity contracts about parts of the sheel mold such as the inner hollow shell core of the shell mold 21, thereby preventing formation of cracks in the casting. When the frozen mercury pattern of the object to be cast is comparatively thin, as in the case of the thin wall gas turbine vane, the walls of the shell mold of the type shown in Fig. 4 may have an overall thickness from about $\frac{1}{16}$ to about $\frac{3}{16}$ inch.

The inner shell layer 23 is first formed over the exposed surfaces of the frozen mercury pattern 17 by applying thereto several strata of the slurry-like shell-forming coating composition, each coating stratum being at least partially dried before applying thereover the next stratum of the coating composition in the manner explained hereinabove.

After drying the exterior stratum of the inner shell layer 23, the outer supporting backing shell layer 29 is formed thereover with a modified shell-forming coating composition having characteristics similar to that used for forming the inner shell layer 23. In order to give the outer backing shell layer 29 relatively great strength, the refractory particle material of the backing layer coating composition is chosen so that it contains partly coarse size particles and partly fine size particles. Such double shell layer mold may be made with a very thin inner shell layer of fine refractory particles, the outer backing shell layer 29 with its coarser refractory particles providing the required strength, while the combined overall thickness of the two shell layers 23, 29 is small enough to permit wall portions of the shell mold to yield when the molten metal which is cast into the mold solidifies and contracts about the core portions of the mold which it partially or wholly surrounds. By way of example, for cast objects of the type described such as the gas turbine vanes or gas turbine buckets, good results are obtained with the inner shell layer 23 made with a wall thickness of about $\frac{1}{64}$ to $\frac{1}{32}$ inch, and the overall thickness of the two shell layers 23, 29, about $\frac{1}{16}$ to $\frac{3}{16}$ or $\frac{1}{4}$ inch.

According to a phase of the invention, explained in connection with Fig. 5, frozen mercury patterns may also be used to form thereon thin single-layer shell molds, the walls of which are backed in a special way by a mass of relatively loose refractory particles. Fig. 5 shows the same frozen mercury pattern 17 of the hollow vane Fig. 3 having formed thereon only a single-layer shell mold 23 corresponding to the inner shell layer 23 of the two-layer mold of Figs. 2, 4. The thin shell mold 23 of Fig. 5 is formed over the frozen mercury pattern 17 in the same way as the inner shell layer 23 of the two-layer layer mold of Figs. 2, 4. The thin shell mold 23 of thin shell mold 23 of Fig. 5 are made sufficiently thin to yield when molten metal contracts about parts of the shell mold in cooling, thus preventing damage to the casting and cracking thereof. In case of frozen mercury patterns for thin castings, such as the vane of Figs. 1, 2, the walls of the shell mold 23 may have an overall thickness from about $\frac{1}{32}$ to about $\frac{1}{8}$ inch. This phase of the invention constitutes the subject matter of application Ser. No. 192,001, filed October 25, 1950, now Patent No. 2,682,692 and need not be more fully explained herein.

After forming on the frozen mercury pattern the thin shell mold 21 (Fig. 4) and drying the applied coating composition layers by driving off the liquir carrier, the mercury of the pattern is liquefied and removed, as by pouring from the cavity of the self-supporting shell mold. The frozen mercury may be melted by bringing liquid mercury into contact with the mercury in the mold cavity. Another and effective method of liquefying the frozen mercury pattern is to place or pass the shell mold containing the frozen mercury pattern through a high-frequency induction field.

After the mercury pattern has been liquefied, the mercury is poured from the shell mold by inverting the flask. The frozen mercury pattern may also be provided with a narrow sprue outlet portion at its bottom, in which case the liquid mercury may be drained from the bottom of the mold. The small aperture remaining in the bottom portion of the mold may be plugged with refractory material prior to casting the molten metal into the mold cavity.

To harden the shell mold 21 and render it resistant to molten metal having a high melting point, the flask 24 with the shell mold 23 and backing mass 25 held therein is now heated in a furnace to a sufficiently high temperature to cause the raised temperature binder to become effective as a binder for the refractory particles in the shell mold and to modify the organic resinous binder as by driving it off, or vaporizing it, to thereby impart porosity to the shell mold. The baking or firing temperature, which may be up to 1250° C., as well as the time required for baking depend upon several factors such as the size and thickness of the shell mold, the temperature of the molten metal to be cast, and the hardness of the mold surface required. Good results are obtained with a baking temperature of red heat or about 1000° C.

When the shell mold has been properly hardened, the mold is removed from the furnace and the mold is ready for casting. When high melting temperature metal is to be cast, or where thin sections are involved, the metal is cast into the shell mold while the mold is still hot. In casting metal having a low fusion point, it is also desirable to cast the metal into a hot mold in order to prevent solidification of the metal before it completely fills the mold.

After the cast metal has been cooled and solidified, the casting may be retrieved by removing the thin shell mold from the casting. A large portion of the shell mold may be easily broken away from the casting and the remainder of the refractory mold may be removed by blasting, such as with sand.

Figs. 7 and 8 show a thin two-layer shell mold of receiver part of a rifle shown in Fig. 6. The receiver pattern 30 of Fig. 6 is used to cast the receiver part of a rifle, indicated below the dash-dot line 30—1. Such rifle receiver has very thin side walls, only one thirty-second ($\frac{1}{32}$) of an inch thick, and the inner surface has special guide ways, which heretofore had to be produced by accurate machining operations. The frozen mercury pattern 30 has a gate portion 33 forming a pattern for the mold gate into which the shank of a rigid metal hook 34 is embedded during the freezing of the mercury. Each of the two side walls 31 of the pattern has two spaced openings 35.

Fig. 7 and 8 show the shell mold 36 of the invention which has an inner thin shell layer 37 and an outer supporting shell layer 38 which were formed on the surfaces of the frozen mercury pattern shown in Fig. 6, including its aligned openings 35 in the manner explained in connection with Figs. 2, 4. The inner shell layer 37 is made very thin, and the outer shell layer 38 provides the required strength, while the combined thickness of the two shell layers 37 and 38 is small enough to permit wall portions of the shell mold to yield when molten metal cast into the mold cools and contracts about portions of the mold which it surrounds. By way of example, for cast objects which are similar to the pattern shown in Fig. 6, having a wall thickness of about $\frac{1}{16}$ to $\frac{1}{4}$ inch, the inner shell layer may have a thickness of $\frac{1}{64}$ to $\frac{1}{16}$ of an inch, and the overall thickness of the two shell layers 37 and 38 of the completed shell mold may be $\frac{1}{16}$ to $\frac{1}{4}$ of an inch thick.

As the thickness of the frozen mercury pattern of the object to be cast is increased, the thickness of the shell layer must also be increased to provide upon the liquefaction and removal of the mercury a shell mold of sufficient thickness to resist the impact of the molten metal cast into the shell mold which in such case will be larger in amount than when a thin casting cavity is provided. When the thickness of the frozen mercury pattern is large, it is not necessary, however, to increase the thickness of the applied shell layer, or shell layers, in the same ratio as the thickness of the pattern is increased because in such cases only a slight increase in the thickness of the shell layer, or combined shell layers, will provide ample strength in the finally formed shell mold. Even when the pattern of the object to be cast is comparatively large, it is not necessary to provide a shell mold having an average thickness greater than approximately $\frac{1}{4}$ to $\frac{3}{8}$ of an inch because shell molds having such thickness will resist the impact of a large amount of molten metal cast into the shell mold and will be thin enough to yield when metal which is cast into the cavity of the shell mold contracts about portions of the shell mold during cooling. When a shell mold having an average thickness of $\frac{1}{4}$ to $\frac{3}{8}$ of an inch is provided, the average thickness of the inner shell layer may vary from approximately $\frac{1}{32}$ to $\frac{1}{16}$ of an inch in thickness.

When molten metal of high temperature is cast into the mold cavity, such as shown in Figs. 7 and 8, to form concave or hollow metal articles, the molten metal contracts upon cooling about portions of the shell mold which it partly or wholly surrounds and these shell mold portions must be thin enough to yield to prevent the formation of cracks in the casting. The solidifying cast molten metal also contracts about convex portions of the shell mold which define the concave inner surfaces of the cast metal article, such as shown in Fig. 8, and these convex mold portions must also be thin enough to yield to prevent formation of cracks in the thin casting portions. The portion of the shell mold structure where the highest contraction of the cast metal takes place, such as the slot sections 35 of Figs. 7, 8, may be made in the form of a thin single shell layer, while other portions of the mold may consist of two shell layers, suitable masks or removable blocking elements being applied to the slot sections 35 when the second shell layer is formed on other parts. The outer shell layer is formed of a coating composition similar to that used in making the inner layer, except that the refractory material consists partly of fine particle size and partly of coarse particle size.

According to a phase of the invention, in cases requiring still larger self-supporting mold structures, the shell molds of the invention are made out of three shell layers, as shown by way of example in Figs. 9, 10 and 11. A frozen mercury pattern 40 (Fig. 9) of the object to be cast has four wings 41 extending from a central body part 42. The several elements of the structure are of relatively intricate designs. The four wings 41 of the pattern have spruce patterns 43, and at the center there is a gate pattern 44. A metal hook 45 is frozen into the mercury pattern for handling it.

Figs. 10 and 11 show a three-layer shell mold formed with the frozen mercury pattern of Fig. 9. It comprises a thin inner shell layer 46, a thin intermediate buffer layer 47, and an outer shell layer 48. The buffer layer 47 is formed of relatively movable or loose refractory particles which while resisting lateral displacement of the inner layer 46 permits it to yield slightly when hot molten metal is cast into the shell mold. The inner shell layer 46 is of sufficient thickness to permit it to yield when cast molten metal contracts on cooling about mold portions or about cores or mold inserts. The outer shell layer 48 serves as a backing support for the inner and buffer shell layers 46, 47 and prevents lateral displacement of the inner shell layer portions 46 under the impact of cast molten metal.

The thickness of the inner shell layer 46 may vary in thickness from about 1/50 to 1/20 of an inch. The outer shell layer may be of sufficient thickness to provide an overall mold thickness of about 1/8 to 3/8 of an inch. In general, the overall thickness of the shell mold structure, whether consisting of two or three shell layers, need not be greater than about 1/8 to 3/8 of an inch. Such thin shell molds may be placed in a mass of loose freely flowing sand within a surrounding flask and the thin shell walls have the desired strength to prevent lateral deformation of the shape-defining inner shell layer by the impact of cast molten metal.

According to a phase of the invention, the shell-forming investment coating compositions which are used to prepare the inner shell layer comprise refractory particles constituting a predominant amount of the solid ingredients of the composition, a raised temperature binder that is ineffective as a binder for the refractory particles at the freezing temperature of mercury but which becomes effective at a raised temperature and which after becoming effective binds the refractory particles together up to the casting temperature of substantially all metals and alloys as well as at low temperatures, and an organic resinous binder having the properties of being adherent to a frozen mercury pattern at temperatures below the freezing point of the pattern and being coherent to previously applied layers or films of the same or a similar composition at temperatures below the freezing point of mercury. The organic resinous binder must also be capable of binding the refractory particles and the raised temperature binder together at temperatures from below the freezing point of mercury up to the raised temperature at which the raised temperature binder becomes effective in binding the refractory particles. It is also desirable that the organic resinous binder shall have the property of becoming modified on heating, as by decomposition or vaporization, to provide vapors which exude through the shell walls and render them porous. In practice, this is achieved by baking the shell mold at a raised temperature, usually about 1000° C., for causing the raised temperature binder to become effective as a binder for the refractory particles. However, it is not essential that the raised temperature binder shall form part of the coating composition because after the mercury has been liquefied and removed from the mold cavity, the shell mold may be impregnated with a binder that becomes effective as a binder for the refractory particles at raised temperatures.

To enable the composition to be applied in the form of a slurry to the frozen mercury pattern, there is provided a liquid carrier for the solid composition ingredients. The carrier must remain liquid at least at temperatures as low as the frozen mercury pattern and must have a boiling point below normal temperatures so that it will volatilize in a short period of time at temperatures below the freezing point of the pattern.

Any suitable refractory material that may be formed into fine particles and which is resistant to high temperatures may be used in shell-forming coating compositions for preparing the shell molds of the invention. Among desirable refractory materials are zirconium silicate and stabilized zirconia (zirconium oxide). Also beryllium oxide, aluminum oxide and silicon oxide. Also silica, chromite, magnesium oxide, aluminum silicate, such as sillimanite or mullite, alumina, ground quartz, flint, silicon carbide. Also, a mixture of two or more of such materials, or a mixture of magnesium oxide and calcium oxide. As an example, in commercial practice, very good results are obtained by using zirconium silicate as the refractory particle material. Good results are obtained with the refractory particles forming about 85% to 95% or more of the normally solid ingredients of the composition.

In the investment coating composition for forming the inner shell layer 23, 37 or 46 of a shell mold structure consisting of two or more shell layers, such as shown in Figs. 4, 7 and 10, or a thin single layer shell mold, such as shown at 23 in Fig. 5, the refractory particles should be sufficiently fine to provide a smooth hard mold cavity surface so as to yield a metal casting having a smooth surface. In practice, excellent results are obtained with refractory particles of −325 mesh particle size. In general, particles of an average size from minus 60 mesh to minus 1000 mesh are suitable. A comparatively smooth mold surface will be obtained with the refractory particles minus 150 mesh to about minus 350 mesh in size. Extremely fine refractory material are less desirable as the resulting shell mold is of lesser porosity. When extremely fine particles are used, it is desirable to mix them with 80 to 90% coarser particles.

The low temperature binder for the refractory particles of the investment composition must be effective as a binder at temperatures from very low temperatures below the freezing temperature of the frozen mercury pattern up to at least normal temperatures and must have the physical properties of being adherent to a frozen mercury pattern and coherent to additional layers or films of the same or an equivalent composition at said very low temperatures. Certain synthetic organic resinous compounds meet these requirements.

Very good results are obtained with investment compositions containing as low temperature binder a mixture of polyvinyl acetate and ethyl cellulose. Ethyl cellulose that has been ethylated to a material extent, such as to an extent of 46.5% or more, for example 49%, is particularly effective in such binder mixture. Polymerized vinyl acetate retains its binding properties to a greater degree at temperatures ranging from 425° to 540° C. and higher than ethyl cellulose. When a coating composition containing polymerized vinyl acetate is applied to a frozen mercury pattern to form a layer or film, the applied layer or film is also more adherent to the frozen mercury pattern and is more coherent to a previously applied layer or film of the same or similar compositions than layers or films which contain ethyl cellulose as the organic resinous binder. On the other hand, when ethyl cellulose is utilized as a binder for the refractory material, or in combination with one of the other binders, the shell layer is more resistant to moisture than a shell layer in which it is not present.

In utilizing—as an organic resinous binder—a mixture of polymerized vinyl acetate and ethyl cellulose that has been materially ethylated such as to an extent of at least 46.5%, their relative proportions may be varied. For instance, a resinous binder consisting principally of polymerized vinyl acetate and a small but substantial amount of the ethyl cellulose will bind more effectively than polymerized vinyl acetate alone. Likewise, a resinous binder consisting principally of ethyl cellulose and a small but substantial amount of polymerized vinyl acetate will bind more effectively than ethyl cellulose alone. In general, the resinous binder may consist of from about 3 to 6 parts of polymerized vinyl acetate and 1 part of ethyl cellulose to from 3 to 6 parts of ethyl cellulose and 1 part of polymerized vinyl acetate. Investment compositions in which the polymerized vinyl acetate and ethyl cellulose are present in equal proportions are satisfactory. It has been found to be desirable, however, and particularly when the investment composition is applied to the frozen mercury pattern by dipping it, to have an excess of the polymerized vinyl acetate, such as 3 to 6 parts thereof and 1 part ethyl cellulose. (Throughout the specification and claims all proportions are given by weight unless otherwise specifically indicated in each specific instance.)

Other organic resinous binders suitable for such investment coating compositions are the copolymers of acrylonitrile and butadiene ranging in proportions from approximately 33% acrylonitrile and 67% butadiene to 40% acrylonitrile and 60% butadiene. The copolymers of acrylonitrile and butadiene when utilized in coating compositions as the organic resinous binder for the refractory material, have greater strength over a temperature ranging from approximately 425° to 450° C. than the other binders mentioned. Other suitable resinous binders are polymer compounds such as polymerized n-butylmethacrylate, high or low viscosity polymerized isobutylmethacrylate.

The amount of such resinous binder that is present in the investment coating composition may vary from about .25 to 7% of the solid ingredients of the investment composition remaining therein after evaporation of the liquid carrier. Good results are obtained with the low temperature binder forming from approximately .5% to 2% of the solid investment ingredients.

It is also desirable to embody in the investment coating composition a thermosetting resinous material, such as a coumarone-indene resin or a phenol-formaldehyde condensation product in its intermediate soluble stage, in an amount ranging from .25% to 3% of the solid investment ingredients. The phenol-formaldehyde condensation product in its intermediate soluble stage, when dispersed or partially dissolved in the liquid carrier is not adherent to a frozen mercury pattern and has no binding properties at or below the freezing temperature of mercury. It does, however, have the property of giving a smoother surface to the coating strata applied to the frozen mercury pattern. Its presence in the composition, however, is not essential.

The shell-forming slurry-like coating composition to be applied to the frozen mercury pattern also contains a liquid carrier which is capable of holding the refractory particles, the raised temperature binder and the organic resinous binder in a dispersed state or in colloidal solution, at least, if the liquid is stirred or otherwise agitated. It is desirable to provide the resinous binder in the form of small particles so that the resinous binder particles may be held uniformly dispersed or in colloidal solution in the liquid carrier and to have a carrier, which at least partially dissolves the phenol-formaldehyde condensation product. The liquid carrier should be present in an amount sufficient to provide with the normally solid ingredients of the composition a slurry of sufficiently low viscosity to enable the composition to be applied to the frozen mercury pattern in the form of a stratum or film by dipping the frozen mercury pattern in the slurry although it is within the scope of the present invention to apply the composition in any suitable way, such as by pouring, brushing, pumping or spraying on the frozen mercury pattern.

A suitable liquid carrier is one which is liquid when applied to the frozen mercury pattern substantially below its freezing temperatures, such as $-60°$ C. and has a boiling point below normal atmospheric temperatures, such as 15° to 30° C. at atmospheric pressure, and particularly an organic liquid which has a boiling point between about $-40°$ and 0° C. at atmospheric pressure. Liquefied monochlorodifluoromethane (Freon 22) or dichlorodifluoromethane (Freon 12), liquefied methyl chloride, or of two or more mixtures of these liquid carriers are satisfactory. Polymerized n-butylmethacrylate, polymerized isobutylmethacrylate, and polymerized vinyl acetate can be used with liquefied dimethyl ether either alone or mixed with one of the two other carriers or solvents. All of the organic resinous binders given above are suitable for use with a liquid carrier of dichloromonofluoromethane (Freon 21) or trichloromonofluoromethane (Freon 113). Dichloromonofluoromethane and trichloromonofluoromethane, however, boil at temperatures considerably above $-18°$ C. and consequently, the drying of the coating composition on a frozen mercury pattern will be slower when one of these carriers is utilized than lower boiling point carriers. Similar conditions apply to other liquid carriers of a similar type, such as monochloropentafluoroethane (Freon 115), octafluoro-cyclobutane (Freon C–118), dichlorotetrafluoroethane (Freon 114) and the like. When such higher boiling-point carriers are utilized, it is desirable to mix them with a sufficient amount of lower boiling-point carrier, such as liquefied monochlorodifluoromethane (Freon 22), so that the resulting liquid carrier shall have the desired low boiling point.

The desired liquid carrier for the solid ingredients of the composition may also be formed of a mixture of other liquids or liquefied gases particularly when the used resinous binder forms a true or colloidal solution in such mixture of liquids. For instance, polymerized isobutylmethacrylate may be used with a liquid carrier consisting of 90% dichlorodifluoromethane (Freon 12) mixed with 10% dichloromonofluoromethane (Freon 21). Ethyl cellulose and polymerized vinyl acetate form colloidal solutions in liquefied dichlorodifluoromethane (Freon 12) mixed with 30% or more of liquefied dichloromonofluoromethane (Freon 21).

Liquefied monochlorodifluoromethane has proven especially suitable as a carrier for use in coating compositions which are to be applied to casting patterns of pure frozen mercury because it is a gas at normal temperature, is in the liquid state at the temperature of the frozen mercury pattern, it has a high vapor pressure and volatilizes in a short period of time at temperatures below $-40°$ C. The liquid carrier should be present in a sufficient amount as to enable it to hold suspended or dispersed or in colloidal solution the organic resinous binder particles, and, if stirred or agitated, to hold suspended or dispersed the refractory particles and raised temperature binder particles. A sufficient amount of the liquid carrier should be present to provide, together with the solid composition ingredients, a slurry of the desired viscosity, variable in accordance with the intricacies of the pattern, so that it shall readily penetrate all narrow pattern crevices. For coating intricate frozen mercury patterns, the viscosity of the slurry for preparing the inner shell layer should be about 100 to 150 centipoises at $-60°$ C. so that the slurry when applied will penetrate into indentations and small or narrow openings and will form a thin film or stratum on thin closely spaced fins or the like. For less intricate patterns, the viscosity of the slurry may be higher, up to about 250 centipoises at $-60°$ C. The slurry for the outer backing shell layer may have a still higher viscosity, such as from 400 to 1600 centipoises at $-60°$ C.

The raised temperature binder for the refractory particles is so chosen as to become effective as a binder for the refractory particles at or above normal temperatures and which, after becoming effective, binds the refractory particles together for at the casting temperature of substantially all metals and alloys, such as metals or alloys having a fusion point of approximately 1800° C. or higher, as well as at low and intermediate temperatures. Inorganic binders which become effective at temperatures ranging from 350° to 1250° have proven especially suitable. Various compounds or mixtures of compounds have proven suitable as raised temperature binder for shell-forming coating compositions of the invention.

According to a phase of the invention, strong thin porous shell molds of the type described above may be formed over frozen mercury patterns by combining the refractory particles with raised temperature binders which consist wholly or partly of a metal borate or of compounds which react to form a metal borate, and they include the borates of sodium, potassium, lithium, magnesium, calcium, strontium, barium, zinc, lead, and of aluminum and beryllium. Because they become effective as a binder for the refractory particle material at lower temperatures, the alkali metal borates (including metal tetraborates) or compounds which react to form such alkali metal borates are specially suitable.

According to a phase of the invention, very desirable raised temperature binders for the refractory particles of such thin shell molds are provided by a combination of an alkali metal fluoride with a boron compound, such as boric acid or boric oxide. Suitable alkali metal fluorides are the fluorides of sodium, potassium, lithium. Other metal fluorides of the elements of group 1a and 2a of the periodic table, for example, beryllium fluoride and metal fluorides such as cryolite $Na_3AlF_6$, are also suitable for use as such raised temperature binder ingredients for the refractory particles of such thin shell molds.

When combining an alkali metal fluoride with a boron compound, such as boric acid or boric oxide, to provide a raised temperature binder for the refractory particles of such thin shell molds, the relative proportions of the metal fluoride and the boron compound may vary over a wide range and the amount of the boron compound may range from incidental impurities up to a substantial proportion. In general, the proportions of these ingredients may vary from 99% of the metal fluoride with 1% of the boron compound to about 33% of the alkali metal fluoride with about 67% of the boron compound. It is good practice to combine the alkali metal fluoride with 5% to 35% of boric acid or similar boron compounds for use as a raised temperature binder for the refractory particles of such thin shell molds.

As an example, in commercial practice, highly satisfactory strong thin shell molds are obtained by combining the refractory particles with a raised temperature binder consisting of about 75% of the alkali metal fluoride in the form of sodium fluoride and 25% boric acid.

The amount of the raised temperature binder which is combined with the refractory particles for forming the thin shell mold may vary over a wide range and particularly from about .25% to 7.5% of the total solid ingredients of the investment composition. Good results are obtained by combining the refractory particles with .25% to 1% of the raised temperature binder consisting of about 75% of the alkali metal fluoride and 25% of boric acid.

When a thin shell mold containing refractory particles and a small amount, such as 0.5% to 5%, of such raised temperature binder is heated to red heat or about 1000° C., the small amount of these binder ingredients become effective in binding the refractory particles of the thin mold shell into a strong mold structure into which molten metal of high melting temperature may be poured for forming excellent castings. It was believed that when such shell mold is heated to red heat, a part of the metal fluoride reacts with the boron compound and that the excess of the metal fluoride reacts with the refractory particles, and that as a result of these and possibly other reactions the refractory particles become bound into a strong thin shell mold.

Chemical analysis shows that the firing or baking of the shell mold material with the alkali metal salt binder of the type described herein to give it its desired final hardness results in only a very slight loss of weight of the inorganic content of this material. This indicates that there are present therein substantially all the inorganic contents which formed its refractory particles and its raised temperature binder. Spectographic analysis of such fired material showed that there is present therein boron and sodium of the raised temperature binder.

X-ray diffraction studies of such shell mold material made with refractory particles of zirconium silicate $ZrSiO_4$ and fired at about 1000° C. showed that the firing or baking brought about reactions between the refractory particles and components of the raised temperature binder accompanied by the decomposition of some of the zirconium silicate content and the formation of a substantial amount of zirconium dioxide $ZrO_2$ and also of silica, part of which is present in the fired material as a glassy complex and parts of which are present as alpha $SiO_2$ and beta $SiO_2$. The reactions which take place in the firing of such shell mold material are complex and are not fully understood as yet. X-ray spectra of such fired shell mold material give no indication of the presence of boron, or sodium or fluorine.

Since the firing of such shell mold material results in only insignificant weight loss of its inorganic content, it is probable that some of the boron, sodium and fluorine content is in solid solution with some of its crystalline components that are shown by the X-rays, and/or that some of this content is part of the complex glassy phase present in the fired shell mold material.

There were also made X-ray studies of the effect of changes in the duration of the firing and of different firing temperatures on the resulting hardened shell mold material made with zirconium silicate particles and alkali metal salt base binder. It was found that prolonging the firing period results in an increase of the zirconium dioxide and silica content of the fired material. Furthermore, prolonging the firing period causes more of the glassy silica content to become crystallized into alpha $SiO_2$ and beta $SiO_2$. X-ray studies of similar shell mold material fired at different higher temperatures for an alike period showed that the firing at higher temperatures results in an increase of the zirconium dioxide and a corresponding decrease of the zirconium silicate content.

As an example, there were prepared representative samples of shell mold material containing as inorganic components zirconium silicate combined with a binder addition of 75% NaF plus 25% $H_3BO_3$. Similar samples of such material were then fired at 1026° C. for 10 minutes, 1 hour and 5 hours. The X-ray spectrum of the 10 minute sample showed the presence of $ZrSiO_4$ and a relatively small amount of $ZrO_2$. The 1 hour sample had about 50% more and the 5 hour sample about 150% more $ZrO_2$ content. The 10 minute sample had only very slight traces and the 1 hour sample greater traces of crystalline $SiO_2$. The 5 hour sample showed substantial content of crystalline $SiO_2$. On the basis of the X-ray spectrum it is estimated that the 5 hour sample had the same amount of $ZrO_2$ as $ZrSiO_4$.

Another set of similar material samples were fired for 1 hour at 1100°, 1200° and 1315° C. The X-ray spectra showed that with increase of the firing temperature there is an increase in the ratio of $ZrO_2$ to $ZrSiO_4$ content of the samples, the ratio increasing from about ⅓ for the 1100 C. heated sample, to about ⅔ for the 1200° C. heated sample, to about ½ for the 1315° C. heated sample.

As a further specific example, shell mold material formed with zirconium silicate particles and 5% of raised temperature binder consisting of 75% NaF plus 25% $H_3BO_3$, was fired for about 1 hour at about 1000° C. On the basis of the X-ray spectrum it is estimated that in addition to the glassy complex phase present in the sample, its crystalline content consisted of about 90% $ZrSiO_4$, about 6% $ZrO_2$, less than about 2% alpha $SiO_2$ and about 2% beta $SiO_2$. Prolonging the heating results in increase of the $ZrO_2$ and of the crystalline $SiO_2$ content as the silica of some of the formed complex glassy phase becomes crystallized.

On the basis of the X-ray studies, and the chemical and spectrum analyses, it is believed that when representative shell mold material of the invention, consisting of refractory particles of zirconium silicate $ZrSiO_4$ with a small addition of the raised temperature binder consisting of 75% NaF and 25% $H_3BO_3$, are heated or baked at baking temperature between about 1000° C. and 1300° C., part of the zirconium silicate content of the material is decomposed yielding zirconium oxide $ZrO_2$ and silica, the silica being present as alpha $SiO_2$ and beta $SiO_2$ and also as part of a complex glassy phase. This glassy phase is not detected by the X-rays but some of its content crystallizes into alpha $SiO_2$ and beta $SiO_2$ upon further heating of the shell mold material at the baking temperatures. The X-ray spectra give no indication of the presence of NaF or of any sodium borates or sodium silicates in the baked samples.

X-ray spectra studies also indicate that when such shell mold material containing 0.5% to 1% of the raised temperature binder are similarly heated, the shell mold material undergoes similar changes resulting in a binding action which is accompanied by the transformation of a part of the crystalline $ZrSiO_4$ content into $ZrO_2$ and silica, some of the silica being present as alpha $SiO_2$, beta $SiO_2$ and some as part of a complex glassy phase, some of which crystallizes into alpha $SiO_2$ and beta $SiO_2$ with increasing baking time.

Although the X-ray spectra give no indication of the presence of NaF or of sodium borates or sodium silicates in the X-rayed samples of the representative shell mold material, spectographic and chemical analysis show that this material also contains sodium and boron which may be present therein, either in solid solution in some of its crystalline content, such as the zirconium oxide, or as part of the complex glassy phase which may also contain some fluorine.

Analogous reactions take place when shell molds containing refractory particles other than zirconium silicate, such as refractory particles of zirconium oxide, aluminum silicate, aluminum oxide and the like are combined with the raised temperature binder ingredients of the invention described above and heated to at least about 750° C. or up to red heat or about 1000° C. to render the raised temperature binder effective in forming a strong hard shell mold.

Similar results are obtained if investment compositions of similar refractory particles are combined with a raised temperature binder formed of metal borates (including metal tetraborates) such as sodium, potassium or beryllium borate or the tetraborates of these and similar metals or mixtures of such metal borates and metal fluorides, and when thin shell molds formed with such binder compositions are heated to red heat or 1000° C. to render effective the binding action of such raised temperature binder and drive off the resinous low temperature binder, there are obtained strong thin porous shell molds suitable for casting high temperature metal to form complicated castings.

The investment coating composition of the type described above should contain sufficient raised temperature binder to bind the refractory particles together after the shell mold has been heated to a temperature sufficient to modify the organic resinous binder and also during the casting of molten metal into the shell mold. In general, depending upon the binder chosen, amounts of raised temperature binder varying from about .25% to 5% of the total amount of solids in the coating composition (after the carrier vaporizes) have given satisfactory results. In compositions for preparing both the inner shell layer and also the outer shell layer, good results are obtained with the amount of the raised temperature binder forming .5% to 5% and even somewhat higher up to 7% of the solids in the composition (after the carrier evaporates).

The coating composition for producing the outer backing shell layer of a shell mold composed of two or more shell layers, such as backing shell layer 29 (Fig. 4) or backing shell layer 38 (Fig. 8) or backing shell layer 48 (Fig. 10), may be formed of essentially the same ingredients as utilized to form the inner shell layer. However, the refractory particles of the coating composition for the backing-shell layer are chosen to be partly of fine particle size as used for the inner shell layer and partly of coarse particles. As the coarse refractory particles, any suitable refractory particle material capable of resisting high temperatures may be used. The coarse refractory particles may consist of the materials as described above for forming the inner shell layer, including zirconium silicate, zirconium oxide, or beryllium, magnesium or silicon oxide. Also refractory materials such as prefired firebrick particles, prefired silica sand, micaceous material such as vermiculite, an aluminum silicate, such as stillimanite or mullite, or a mixture of two or more of such refractory particle materials. The size of the coarse particles may vary over a wide range, and may have, for instance, an average particle size of −12 mesh to +60 mesh.

Thin shell molds of the invention may be formed with a single shell-forming coating composition as by applying superposed coating strata thereof in any desired manner, such as by dipping, spraying, brushing or pouring, to form a self-supporting thin shell mold of the required thickness. Such thin self-supporting shell mold may also be formed with inner and outer shell layers produced out of different coating compositions, both of which contain the same type of refractory particle material. In actual practice, it has been found desirable to form thin self-supporting shell molds of the invention having an inner shell layer produced with a coating composition containing essentially fine refractory particles and an outer backing shell layer produced with a coating composition containing both coarse and fine refractory particles. The coarse refractory particles give the outer backing shell layer greater strength in resisting lateral movement of the relatively thin walls of the shell mold when molten metal of high temperature is cast into the mold cavity. A shell mold having such coarse-particle backing layer exhibits also greater porosity or permeability in permitting the escape of gases evolved in the mold cavity when hot metal is cast into it. When coating compositions for forming the backing shell layer are made up with the coarse refractory particles only, they tend to settle from the coating slurry composition, and it is more difficult to apply a uniform coating stratum with such composition. This difficulty is avoided by preparing the backing-layer coating composition with a sufficient addition of fine-grade refractory particles to the coarse-grade particles to substantially hold the coarse refractory particles in suspension within the composition slurry. Good results are obtained with backing-layer slurry compositions wherein the proportion of the fine refractory particles to the coarse refractory particles vary over the range between about 3 to 2 and 1 to 1. Depending on the character and the shape of the article to be cast and the size thereof, the proportion of the fine to the coarse particles may be varied over the range between 3 to 2 and 2 to 3.

The following are specific examples of shell-forming coating compositions suitable for preparing the inner shell layer of thin shell molds of the invention of the type shown in Figs. 2 to 10.

*Example A–1*

| | Grams |
|---|---|
| Liquefied monochlorodifluoromethane (Freon 22) | 10,500.0 |
| Polymerized vinyl acetate having a viscosity of 700 to 900 centipoises at 20° C. with molar solution in benzene | 141.8 |
| Ethyl cellulose that has been ethylated to an extent of 46.5% to 48.5% and having a viscosity of 20 centipoises when a 5% solution thereof is dissolved in a mixture of 80% toluene and 20% ethanol | 47.3 |
| Phenol-formaldehyde condensation product condensed to its intermedate soluble stage | 94.5 |
| Boric acid | 46.2 |
| Sodium fluoride | 140.7 |
| Zirconium silicate, −325 mesh particle size | 18,425.5 |

Example A-2

| | Grams |
|---|---|
| Liquefied monochlorodifluoromethane (Freon 22) | 1,950.0 |
| Ethyl cellulose, ethylated to 46.5% and a 5% solution of which in 80% toluene and 20% ethyl alcohol has a viscosity of 10 centipoises | 27.0 |
| Phenol-formaldehyde condensation product condensed to its intermediate soluble stage | 13.5 |
| Boric acid | 6.0 |
| Sodium fluoride | 18.3 |
| Zirconium silicate, −325 mesh particle size | 2,635.2 |

Example A-3

| | Grams |
|---|---|
| Liquefied monochlorodifluoromethane (Freon 22) | 10,500.0 |
| Polymerized vinyl acetate having a viscosity of 700 to 900 centipoises at 20° C. with molar solution in benzene | 81.0 |
| Phenol-formaldehyde condensation product condensed to its intermediate soluble stage | 94.5 |
| Sodium fluoride | 54.8 |
| Boric acid | 18.2 |
| Zirconium silicate, −325 mesh particle size | 7,923.7 |

Example A-4

| | Grams |
|---|---|
| Liquefied monochlorodifluoromethane (Freon 22) | 1,950.0 |
| Polymerized vinyl acetate having viscosity of 700 to 900 centipoises at 20° C. with molar solution in benzene | 27.0 |
| Phenol-formaldehyde condensation product condensed to intermediate soluble stage | 13.5 |
| Borax, anhydrous | 43.5 |
| Zirconium silicate, −325 mesh particle size | 2,615.7 |

Example A-5

| | Grams |
|---|---|
| Liquefied monochlorodifluoromethane (Freon 22) | 800.0 |
| Copolymers of 40% acrylonitrile and 60% butadiene | 13.5 |
| Boric acid | 2.4 |
| Sodium fluoride | 7.3 |
| Zirconium silicate of −325 mesh particle size | 1,326.8 |

Example A-6

| | Grams |
|---|---|
| Liquefied monochlorodifluoromethane (Freon 22) | 1,500.0 |
| High viscosity polymerized isobutylmethacrylate | 27.0 |
| Boric acid | 5.84 |
| Sodium fluoride | 17.5 |
| Zirconium silicate, −325 mesh particle size | 2,639.7 |

Example A-7

| | Grams |
|---|---|
| Liquefied dichlorodifluoromethane (Freon 12) | 765.0 |
| Liquefied dichloromonofluoromethane (Freon 21) | 85.0 |
| Polyisobutyl methacrylate | 13.5 |
| Phenol-formaldehyde condensation product condensed to intermediate soluble stage | 6.7 |
| Boric acid | 1.5 |
| Sodium fluoride | 4.6 |
| Zirconium, −325 mesh particle size | 1,323.6 |

Example A-8

| | Grams |
|---|---|
| Liquefied methyl chloride | 700.0 |
| Polyisobutyl methacrylate | 13.5 |
| Boric acid | 3.0 |
| Sodium fluoride | 9.1 |
| Zirconium silicate, −325 mesh particle size | 1,324.4 |

The following are examples of coating compositions which are suitable for preparing the outer shell layer of shell molds of the type shown in Figs. 2, 4, Figs. 6 to 8 and Figs. 9 to 11.

Example B-1

| | Grams |
|---|---|
| Liquefied monochlorodifluoromethane (Freon 22) | 18,000.0 |
| Polymerized vinyl acetate having a viscosity of 700 to 900 centipoises at 20° C. with molar solution in benzene | 400.0 |
| Ethyl cellulose ethylated to an extent of 46.5% to 48.5% and having a viscosity of 20 centipoises when a 5% solution thereof is dissolved in a mixture of 80% toluene and 20% ethanol | 132.0 |
| Phenol-formaldehyde condensation product condensed to its intermediate soluble stage | 148.0 |
| Sodium fluoride | 54.0 |
| Boric acid | 18.0 |
| Zirconium silicate, −14 mesh, +25 mesh particle size | 14,568.0 |
| Zirconium silicate, −325 mesh particle size | 23,952.0 |

Example B-2

| | Grams |
|---|---|
| Liquefied monochlorodifluoromethane (Freon 22) | 8,900.0 |
| Polymerized vinyl acetate having a viscosity of 900 centipoises at 20° C. with molar solution in benzene | 225.0 |
| Ethyl cellulose, ethylated to from 46.5% to 48.5% and a 5% solution of which in 80% toluene and 20% ethyl alcohol has a viscosity of 20 centipoises | 75.0 |
| Boric acid | 8.9 |
| Sodium fluoride | 27.3 |
| Zirconium silicate, −325 mesh particle size | 7,865.4 |
| Aluminum silicate (mullite), −14 mesh, +35 mesh particle size | 11,798.3 |

Example B-3

| | Grams |
|---|---|
| Liquefied monochlorodifluoromethane (Freon 22) | 3,660.0 |
| Copolymers of 60% butadiene and 40% acrylonitrile | 59.5 |
| Boric acid | 2.7 |
| Sodium fluoride | 8.1 |
| Zirconium silicate, −325 mesh particle size | 2,362.5 |
| Firebrick, −12 mesh, +40 mesh particle size | 3,528.8 |

Example B-4

| | Grams |
|---|---|
| Liquefied monochlorodifluoromethane (Freon 22) | 3,600.0 |
| Polymerized isobutylmethacrylate, high viscosity | 59.5 |
| Boric acid | 2.7 |
| Sodium fluoride | 8.1 |
| Zirconium silicate, −325 mesh particle size | 2,653.5 |
| Firebrick, −12 mesh, +40 mesh particle size | 3,528.8 |

Example B-5

| | Grams |
|---|---|
| Liquefied monochlorodifluoromethane (Freon 22) | 6,630.0 |
| Polymerized isobutylmethacrylate, high viscosity | 148.8 |
| Boric acid | 6.7 |
| Sodium fluoride | 20.2 |
| Zirconium silicate, −325 mesh particle size | 5,881.3 |
| Firebrick, −12 mesh, +40 mesh particle size | 2,822.0 |

In general, the shell-forming coating compositions given above in Examples A–1 to A–8 are suitable for producing the outer backing shell layer by substituting for the fine refractory particle ingredients thereof, a mixture of coarse refractory particles with fine refractory particles proportioned in the manner given above for the refractory particle ingredients of the foregoing Examples B-1 to B-5. Furthermore, the amount of the liquid carrier, such as liquefied monochlorodifluoromethane, present in the examples of the coating compositions given above may be increased (or decreased) for decreasing (or increasing) the viscosity of the coating composition in accordance with the particular requirements and the particular shape of the frozen mercury pattern of the cast article that is to be produced with a thin-walled shell mold of the invention.

Any of the shell-forming coating compositions given in Examples A-1 through A-8 may be utilized for forming the inner shell layer of a thin-wall shell mold of the invention and any of the compositions given in Examples B-1 through B-5 may be utilized in preparing the outer backing shell layer of such shell mold.

In producing shell molds of the invention, it is also of advantage to use shell-forming coating compositions of the type given in the foregoing examples which contain the combination of polymerized vinyl acetate and ethyl cellulose as the organic resinous material, either with or without a thermosetting resin ingredient, such as phenol-formaldehyde condensation product. When a phenol-formaldehyde condensation product is utilized in the shell-forming coating composition, it does not become effective as a binder for the refractory particles until it is converted by the applied heat into its infusible insoluble state, thus supplementing the organic resinous binder ingredients in binding the refractory particles together at temperatures in the range from about 450° to 1000° C., and becoming modified into vapors, thereby giving the thin shell mold its desired great porosity.

In preparing the inner shell layer of a shell mold consisting of one or more shell layers, it is also desirable to utilize as the raised temperature binder in the inner shell layer a compound or a mixture of compounds having an alkali metal salt base, such as a metal fluoride or a metal borate or a mixture of a metal fluoride and boron compound. The hardness of the inner surface of the mold cavity may be controlled by varying the percentage of such raised temperature binder that is used in forming the shell mold. Compounds containing an alkali metal salt are particularly suitable, such as sodium fluoride, sodium borate, or sodium tetraborate, or a mixture of sodium fluoride and sodium borate or sodium tetraborate, or compounds which react to provide sodium borate or sodium tetraborate or a mixture of sodium fluoride and sodium borate or sodium tetraborate.

In preparing a slurry of the shell-forming compositions for producing shell molds of the invention, the solid ingredients of the composition are precooled to a temperature below the freezing temperature of the frozen mercury pattern and then thoroughly mixed with the liquefied monochlorodifluoromethane, which is also maintained at such low temperature.

To facilitate the mixture of the raised temperature binder with the refractory particles, a premixture of the raised temperature binder with a portion of the refractory material may be prepared prior to mixing the solid ingredients with the liquefied carrier or solvent, such as monochlorodifluoromethane. For instance, in preparing the composition disclosed in Example A-1, the sodium fluoride and boric acid may be premixed with a portion of the zirconium silicate to approximately 1 part of the combined weight of the sodium fluoride and boric acid and this premixture may be suitably ground, as in a ball or pebble mill, for approximately six hours. This premixture, and the other solid ingredients of the composition, are then precooled to a temperature below the freezing temperature of the frozen mercury pattern, and added to the liquefied monochlorodifluoromethane which is also maintained at such low temperature.

Shell molds of the invention which contain the raised temperature binder have proven very effective for casting metals of high melting temperatures, such as cobalt-chromium-nickel alloys (Vitalium) or stainless steel alloys, into articles such as gas turbine buckets, gas turbine vanes or the like.

In order to render the raised temperature binder effective the shell mold has to be subjected to a baking or firing treatment at elevated temperatures, at which the raised temperature binder becomes effective in binding the refractory particles into a self-supporting shell, and at which the low temperature resinous binder is fully, or at least partially modified into a vapor and driven off to render the mold porous.

Baking temperatures in the range of about 800° C. to 1200° C. give good results. At such baking temperatures, the low temperature organic resinous binder is modified to provide a vapor which exudes or is driven off through the mold walls thereby rendering the shell mold porous, and the raised temperature binder becomes effective in binding the refractory particles together.

After the shell molds of the invention from which the mercury has been removed, are fired with the raised temperature binder present, the metal may be cast therein by any desirable method, such as by static or centrifugal casting, or the molten metal may be cast in the shell mold under pressure or under vacuum. Thus, a shell mold such as shown at 21 in Fig. 4, may be suspended in a suitable vessel, such as in flask 24, of Fig. 5, and supported therein by any suitable loose-particle refractory material such as loose sand which is placed or blown around the shell mold. When the shell mold is intricate and it is difficult for the loose refractory material to flow into the fine crevices, the flask 24 is vibrated to assist in packing the loose refractory particles. The hot molten metal is cast into the cavity of the thin-walled shell mold 21 so held suspended within flask 24. Since the shell mold of the invention is thin and porous, it permits gases to pass through walls of the shell mold during casting of the molten metal.

When casting small parts, such as turbine buckets, it is good practice to combine a substantial number of individual frozen mercury patterns into a cluster and form the thin shell mold of the invention around such pattern cluster. The resulting shell mold has a common, generally vertical hollow runner with a plurality of transverse hollow runners to which are joined the inlet ends of the upwardly projecting individual shell molds. The hot molten metal is poured through a gate into the top of the common runner, and because of the high porosity of the individual shell molds, the hot molten metal flows freely through the transverse runners and therefrom through their open bottom ends into the individual shell molds, rising therein until they are all filled as the metal is poured into the common runner.

Refractory particles of the type used in making shell molds of the invention as described above when combined with a small amount of a thermosetting resin and a raised temperature binder selected from the group consisting of metal fluorides, metal borates and a combination of a metal fluoride with a boron compound such as boric acid and boric oxide are also highly effective for producing thin sectional shell molds around heated metal patterns in the manner described in the publication Fiat Final Report No. 1168 dated May 30, 1947 distributed by the Department of Commerce.

As an example, in forming such sectional shell molds, the refractory particles, such as zirconium silicate are combined with a small addition of a thermosetting resin and the high temperature binder of the invention described above such as consisting of 75% NaF, and 25% $H_3BO_3$. The refractory particles may be of a particle size of $-150$ mesh and the binder ingredients should likewise be in the form of small particles. Good results are obtained by mixing the refractory particles with binder particles of a particle size $-350$ mesh in a ball mill or other mixing equipment so that the small amounts of the binder ingredients are distributed throughout the much larger body of the loose refractory particles. The pattern, which is as a rule of metal, is heated to a temperature at which the thermosetting resin binder ingredients will become set and bind the refractory particles and the raised temperature binder particles with which they are mixed. Thus, the pattern may be heated to a temperature between about 250° and 450° C. In practice, good results are obtained with a metal pattern heated to about 300° to 320° C., when the resin binder addition consists of a phenolic condensation product. The mixture of the loose refractory particles with the small additions of resin and raised temperature binder admixed thereto, as described above, is then dumped or sifted over the surface of the heated metal pattern to form a layer about ¼ inch thick. At least part of the resin binder admixed with the refractory particles of this layer becomes set as it comes in contact with the hot metal pattern, thereby binding the refractory particles and the raised temperature binder particles at least of the refractory particle stratum or layer which is directly in contact with the hot pattern into a shell layer section held in position by the metal pattern.

Thereafter, the metal pattern with the sectional shell mold layer so formed thereon is heated for a few minutes, such as 2, 3 or 5 minutes, at the same temperatures, such as 320° C., to complete the setting of and make fully effective the thermosetting resin binder ingredients contained in the shell layer thereby giving it a strength so that it will remain self-supporting after removal from the metal pattern. The pattern with the sectional mold so formed thereon is then removed from the oven and the self-supporting mold section is removed from the pattern, usually after previously cooling the same.

The self-supporting sectional mold body is then placed in a furnace where it is heated at a raised temperature which causes the raised temperature binder to become set and the resin ingredients to be vaporized or otherwise driven off. It is good practice to heat the shell mold sections at a temperature between about 1000° and 1200° C., and good results are obtained by heating at about 1000° C. for 2 hours. After completing the heating or baking treatment, the mold section may be assembled with a similarly prepared complementary mold section or sections into a mold having the desired mold cavity for casting therein metal articles of metals, including reactive metals such as molten titanium having the shape of the mold cavity.

Effective sectional shell molds of the type just described may be produced by admixing to the refractory particles ½% to about 7.5% of the resin binder and about ½ to 7½% of the high temperature binder. Good results are obtained with a resin binder addition of 1 to 1½% and a raised temperature binder addition of 1%, the balance consisting of the refractory particles.

As stated hereinbefore, in actual commercial practice, highly effective thin porous self-supporting shell molds of the invention are formed with investment compositions containing only about 1% of the low temperature binder and only about 1% of the raised temperature binder, it should be noted that satisfactory shell molds of the invention may be formed with the low temperature binder content and the high temperature binder content each increased up to about 7½% and even up to about 15%. However, when the low temperature binder content and raised temperature binder content of said shell molds are increased to about 15%, it is important that the investment composition should contain about the same proportion of the raised temperature binder as of the low temperature binder.

In some cases, it may be desired to form the exterior shell layer of the shell molds of the invention with a high temperature binder which becomes effective in binding the refractory particles at a raised temperature lower than the relatively higher temperature at which a shell layer formed of refractory particles and an inorganic binder consisting of a metal fluoride and a boron compound such as boric acid and boric oxide become bound into a strong hard shell mold layer. As the high temperature binder becomes effective at a lower raised temperature such as 350 to 500° C., there may be used ammonium phosphate particles admixed to the refractory particles. However, shell molds of the type disclosed hereinabove wherein the refractory particles are bound by such other high temperature binder are not part of the present invention and are not claimed herein.

It will be apparent to all those skilled in the art that the novel principles of the invention disclosed herein in connection with specific exemplifications thereof will suggest various other modifications and applications of the same. It is accordingly desired that in the present invention they shall not be limited to the specific exemplification thereof described herein.

We claim:

1. In a porous mold, a shell layer having an inner cavity surface forming the mold cavity of the object to be cast and consisting essentially of shell ingredients consisting of a predominant amount of refractory particles with the inner layer stratum having refractory particles of small size to provide a smooth inner cavity surface, said shell layer having embodied therein an inorganic binder for said refractory particles constituting 0.25% to 5% of said shell ingredients and composed of a metal fluoride together with a boron compound selected from the group consisting of boric acid, boric oxide and metal borates, said shell layer having substantial porosity, and the refractory particles and inorganic binder of said shell layer having been heated to a raised temperature of at least 750° C. to cause said refractory particles and binder to combine into a strong hard shell layer.

2. In a shell mold as claimed in claim 1, said inorganic binder constituting at most 5% of said solid ingredients and being composed of an alkali metal fluoride and a boron compound selected from boric acid and boric oxide.

3. In a shell mold as claimed in claim 2, said inorganic binder ingredients ranging from about three parts of said metal fluoride and one part of said boron compound to one part of said metal fluoride and three parts of said boron compound.

4. In a shell mold as claimed in claim 3, the metal fluoride content being at least twice of the boron compound content.

5. In a shell mold as claimed in claim 1, said inorganic binder constituting at most 5% of said solid ingredients and being composed of an alkali metal fluoride and a boron compound selected from boric acid and boric oxide, the thickness of major parts of the walls of said shell mold being at most about one quarter of an inch.

6. In a shell mold, a shell layer having an inner cavity surface forming the mold cavity of the object to be cast and consisting essentially of shell ingredients consisting of a predominant amount of refractory particles with the inner layer stratum having refractory particles of small size to provide a smooth inner cavity surface, an inorganic binder for said refractory particles constituting 0.25% to 5% of said shell ingredients and composed of a metal fluoride together with a boron compound selected from the group consisting of boric acid, boric oxide and metal borates, which inorganic binder is present in sufficient amount and has the property of causing said refractory particles and said inorganic binder to combine and form a hard shell layer upon being heated to a raised temperature of at least 750° C. and an organic resinous binder for said refractory particles and said inorganic binder constituting 0.25% to 7% of said shell ingredients, which resinous binder has the property of binding said refractory particles and said inorganic binder over the temperature range from below the freezing temperature of mercury up to said raised temperature, said resinous binder being present in sufficient amount to bind the refractory particles and said inorganic binder into a self-supporting shell layer over said temperature range and being modified and driven off when heated to said raised temperature to render said shell layer porous.

7. In a shell mold as claimed in claim 6, said inorganic binder constituting at most 5% of said solid ingredients and being composed of an alkali metal fluoride and a boron compound selected from boric acid and boric oxide, said resinous binder being at most about 5% of said solid ingredients.

8. In a shell mold as claimed in claim 7, said inorganic binder ingredients ranging from about three parts of said metal fluoride and one part of said boron compound to one part of said metal fluoride and three parts of said boron compound.

9. In combination with a frozen casting pattern consisting predominantly of mercury of a shell mold as claimed in claim 6 adhering with its inner layer structure to said frozen pattern.

10. A shell mold prepared by applying an investment composition as claimed in claim 6 to the surface of a metal pattern in the form of a shell layer maintaining the shell layer and the metal at a temperature which causes the resin binder to become set and bind the refractory particles and the other solid ingredients of said shell layer into a self-supporting shell structure, removing the self-supporting shell layer structure from the metal pattern and heating it at an elevated temperature between 750° and 1300° C. to cause the refractory particles and the inorganic binder to combine into a hard refractory shell layer and to modify and drive off said resin binder and render said shell layer porous.

11. A slurry-like investment coating composition for application as a shell layer to a frozen mercury pattern at very low temperatures below the freezing temperature of said pattern which composition consists essentially of normally solid ingredients consisting of a predominant amount of refractory particles, an inorganic binder for said refractory particles constituting 0.25% to 5% of said solid ingredients and composed of a metal fluoride together with a boron compound selected from the group consisting of boric acid, boric oxide and metal borates, which inorganic binder is present in sufficient amount and is effective upon heating said shell layer to raised temperature of at least 750° C. to cause said refractory particles and said inorganic binder of said shell layer to combine into a strong hard shell layer, an organic resinous binder for said refractory particles and said inorganic binder, which resinous binder is effective and is present in sufficient amount to bind said refractory particles and said inorganic binder into a firm shell layer over the temperature range from said low temperatures up to said raised temperature, and a liquid carrier which is at least a colloidal solvent for said resinous binder at said very low temperatures and has a boiling point at low temperatures at most 70° C. higher than said freezing temperatures, which carrier is present in sufficient amount to maintain at least in colloidal solution an amount of said resinous binder which constitutes at least 0.25% of said solid ingredients and to provide with said solid ingredients a slurry of sufficiently low viscosity to enable application of said slurry as a coating layer to said frozen pattern at said very low temperatures.

12. An investment composition as claimed in claim 11, said inorganic binder constituting at most 5% of said solid ingredients and being composed of an alkali metal fluoride and a boron compound selected from boric acid and boric oxide.

13. An investment composition as claimed in claim 12, said inorganic binder ingredients ranging from about three parts of said metal fluoride and one part of said boron compound to one part of said metal fluoride and three parts of said boron compound.

14. The method of preparing a porous shell mold which comprises applying to a frozen mercury pattern of an object to be cast a slurry-like investment composition capable of forming a thin shell layer adhering to said pattern at very low temperatures below the freezing temperature of the pattern material, which composition consists essentially of solid ingredients consisting of a predominant amount of refractory particles, an inorganic binder for said refractory particles constituting 0.25% to 5% of said solid ingredients and composed of a metal fluoride together with a boron compound selected from the group consisting of boric acid, boric oxide and metal borates, and which inorganic binder is present in a sufficient amount and is effective upon heating said shell layer to raised temperature of at least 750° C. to cause said refractory particles and said inorganic binder of said shell layer to combine into a hard shell layer, an organic resinous binder for said refractory particles and said inorganic binder constituting 0.25% to 7% of said solid ingredients, which organic binder is present in sufficient amount and has the property of adhering to said frozen pattern and of binding said refractory particles and inorganic binder into a self supporting shell layer at temperatures from said very low temperatures up to said raised temperature and of causing said organic binder to be modified and driven off when said shell layer is heated to said raised temperature, and a liquid carrier which is at least a colloidal solvent for said resinous binder at said very low temperatures and has a boiling point at low temperatures at most 50° C. higher than said freezing temperature, which carrier is present in sufficient amount to maintain in at least colloidal solution an amount of said resinous binder which constitutes at least 0.25% of said solid ingredients and to provide with said solid ingredients a slurry of sufficiently low viscosity to enable application of said slurry as a coating layer to said frozen pattern at said very low temperatures, drying said shell layer on said frozen pattern at said very low temperatures and below said boiling point to solidify the shell layer into a self supporting shell mold, liquefying the frozen pattern and removing the liquefied pattern material from said shell mold and thereafter heating said shell mold to said raised temperature to cause said refractory particles and said inorganic binder to combine into a hard shell layer and to modify and drive off said resinous binder and render said shell mold porous.

15. The method for preparing a porous shell mold as claimed in claim 14, the inorganic binder of said applied investment composition constituting at most 5% of said solid ingredients and being composed of an alkali metal fluoride and a boron compound selected from boric acid and boric oxide.

16. The method for preparing a porous shell mold as claimed in claim 15, the inorganic binder ingredients of said applied investment composition ranging from about three parts of said metal fluoride and one part of said boron compound to one part of said metal fluoride and three parts of said boron compound.

17. The method of preparing a porous shell mold which exhibits great hardness at temperatures of the order of 1000° C. and higher corresponding to the melting temperature of metals to be cast into the mold cavity which comprises applying to a solid pattern an investment composition which upon being heated to an intermediate setting temperature between about 100° and 450° C. will form a thin shell layer, which composition consists essentially of homogeneously mixed solid ingredients consisting of a predominant amount of refractory particles having a melting temperature in excess of 1300° C., an inorganic binder for said refractory particles constituting 0.25% to 7.5% of said solid ingredients and composed of a metal fluoride together with a boron compound selected from the group consisting of boric acid, boric oxide and metal borates, which inorganic binder is present in sufficient amount and is effective upon heating said shell layer to a raised temperature of at least 750° C. to cause the refractory particles and said inorganic binder to combine into a hard self-supporting shell layer, and a thermosetting organic resin binder for said refractory particles constituting 0.25% to 7.5% of said solid ingredients and present in sufficient amount to bind the solid ingredients of said composition into a self-supporting shell layer when said composition is applied as a shell layer to said pattern and heated to said setting temperature, keeping the investment composition applied to said heated pattern until a layer of said composition is at least partly solidified into a shell layer, removing the excess of the composition mixture from said solidified shell layer, removing the solidified shell layer from said pattern and further heating said solidified shell layer at elevated temperature between 750° and 1300° C. to cause said refractory particles and said inorganic binder to combine into a hard refractory shell layer and to modify and drive off said resin binder and render said shell layer porous.

18. The method of preparing a shell mold as claimed in claim 17, the step of removing the solidified shell layer from said pattern being preceded by further heating said pattern and the solidified shell layer formed thereon at said setting temperature to cause said resin binder content to become more effective in binding the refractory particles of the shell layer into a self-supporting shell layer.

19. The method of preparing a shell mold as claimed in claim 17, said inorganic binder constituting at most 5% of said solid ingredients and being an alkali metal fluoride together with boric acid.

20. The method of preparing a shell mold as claimed in claim 17, said inorganic binder constituting at most 5% of said solid ingredients and being an alkali metal fluoride together with boric oxide.

21. The method of preparing a shell mold as claimed in claim 17, said inorganic binder constituting at most 5% of said solid ingredients and being an alkali metal fluoride together with a metal borate.

22. An investment composition for application to the surface of a casting pattern heated to setting temperature between 100° and 400° C., and forming thereon a self supporting shell mold layer for use in casting metals of relatively high melting temperature, which composition consists essentially of homogeneously mixed solid ingredients consisting of a predominant amount of refractory particles having a melting temperature in excess of 1300° C., an inorganic binder for said refractory particles constituting 0.25% to 7.5% of said solid ingredients and composed of a metal fluoride together with a boron compound selected from the group consisting of boric acid, boric oxide and metal borates, which inorganic binder is present in sufficient amount and is effective upon heating said shell layer to a raised temperature of at least 750° C. to cause the refractory particles and said inorganic binder to combine into a hard self supporting shell layer, and a thermosetting organic resin binder for said refractory particles constituting 0.25% to 7.5% of said solid ingredients and present in sufficient amount to bind the solid ingredients of said composition into a self-supporting shell layer when said composition is applied as a shell layer to said pattern and heated to said setting temperature, the organic binder of said composition being disintegrated and vaporized upon heating a shell layer of said composition to said raised temperature for rendering the so heated shell layer porous.

23. An investment composition as claimed in claim 11, said inorganic binder constituting at most 5% of said solid ingredients and being an alkali metal fluoride together with boric acid.

24. An investment composition as claimed in claim 11, said inorganic binder consituting at most 5% of said solid ingredients and being an alkali metal fluoride together with boric oxide.

25. An investment composition as claimed in claim 11, said inorganic binder consituting at most 5% of said solid ingredients and being an alkali metal fluoride together with a metal borate.

26. In a shell mold, a shell layer having an inner cavity surface forming the mold cavity of the object to be cast and comprising as solid shell ingredients a predominant amount of refractory particles, an inorganic binder for said refractory particles consisting essentially of .25% to 7.5% of said shell ingredients and composed of a metal fluoride and a boron compound selected from the group consisting of boric acid, boric oxide and metal borates, which inorganic binder is present in sufficient amount and has the property of causing said refractory particles and said inorganic binder to combine into a hard shell layer upon being heated to a raised temperature of at least 750° C., the refractory particles and the inorganic binder being bound in the form of a self-supporting shell mold by a set thermosetting resin content of the shell mold.

27. In a shell mold as claimed in claim 26, said inorganic binder forming at most 5% of said shell ingredients and bing composed of an alkali metal fluoride and boric acid.

28. In a shell mold as claimed in claim 26, said inorganic binder forming at most 5% of said shell ingredients and being composed of an alkali metal fluoride and boric oxide.

29. In a shell mold as claimed in claim 26, said inorganic binder forming at most 5% of said shell ingredients and bing composed of an alkali metal fluoride and a metal borate.

References Cited in the file of this patent

UNITED STATES PATENTS 2,682,692    Kohl _____ July 6, 1954